(12) United States Patent
McBrian

(10) Patent No.: US 9,215,407 B2
(45) Date of Patent: Dec. 15, 2015

(54) HANDS-FREE VIDEO TELEPHONY

(71) Applicant: Jay McBrian, Vero Beach, FL (US)

(72) Inventor: Jay McBrian, Vero Beach, FL (US)

(\*) Notice: Subject to any disclaimer, the term of this patent is extended or adjusted under 35 U.S.C. 154(b) by 336 days.

(21) Appl. No.: 13/838,050

(22) Filed: Mar. 15, 2013

(65) Prior Publication Data

US 2014/0267539 A1 Sep. 18, 2014

(51) Int. Cl.
| | |
|---|---|
| H04M 1/00 | (2006.01) |
| H04N 7/14 | (2006.01) |
| H04N 5/225 | (2006.01) |
| A45F 5/00 | (2006.01) |
| A45F 3/00 | (2006.01) |

(52) U.S. Cl.
CPC ........ *H04N 7/144* (2013.01); *A45F 5/00* (2013.01); *H04N 5/2251* (2013.01); *H04N 7/142* (2013.01); *A45F 2003/002* (2013.01); *A45F 2005/006* (2013.01); *A45F 2200/0516* (2013.01); *A45F 2200/0533* (2013.01)

(58) Field of Classification Search
CPC . H04N 5/2251; A45F 5/00; A45F 2200/0516; A45F 2200/0533; A45F 2203/002; A45F 2205/006

USPC ............. 348/14.01–14.16; 455/569.1–575.9, 455/90.1–90.3; 709/201–207, 217–248
See application file for complete search history.

(56) References Cited

U.S. PATENT DOCUMENTS

| | | | | |
|---|---|---|---|---|
| 4,153,362 | A | * | 5/1979 | Dietz et al. .................... 396/423 |
| 4,864,646 | A | * | 9/1989 | Nesbit et al. .................. 455/344 |
| 5,806,734 | A | * | 9/1998 | Scott ............................. 224/265 |
| 6,006,970 | A | * | 12/1999 | Piatt .............................. 224/257 |
| 6,211,903 | B1 | * | 4/2001 | Bullister .................... 348/14.16 |
| D533,994 | S | * | 12/2006 | Hussaini et al. ............... D3/218 |
| 7,901,148 | B2 | * | 3/2011 | Zunker ......................... 396/428 |
| 8,418,900 | B1 | * | 4/2013 | Baker ........................... 224/262 |
| D705,210 | S | * | 5/2014 | Adelman et al. ............. D14/253 |
| 8,724,801 | B2 | * | 5/2014 | Freelander ................... 379/441 |
| 2002/0094845 | A1 | * | 7/2002 | Inasaka ......................... 455/566 |

\* cited by examiner

*Primary Examiner* — Hemant Patel
(74) *Attorney, Agent, or Firm* — Steven Thrasher

(57) ABSTRACT

The invention provides systems and devices that enable hands-free videotelephony. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

13 Claims, 2 Drawing Sheets

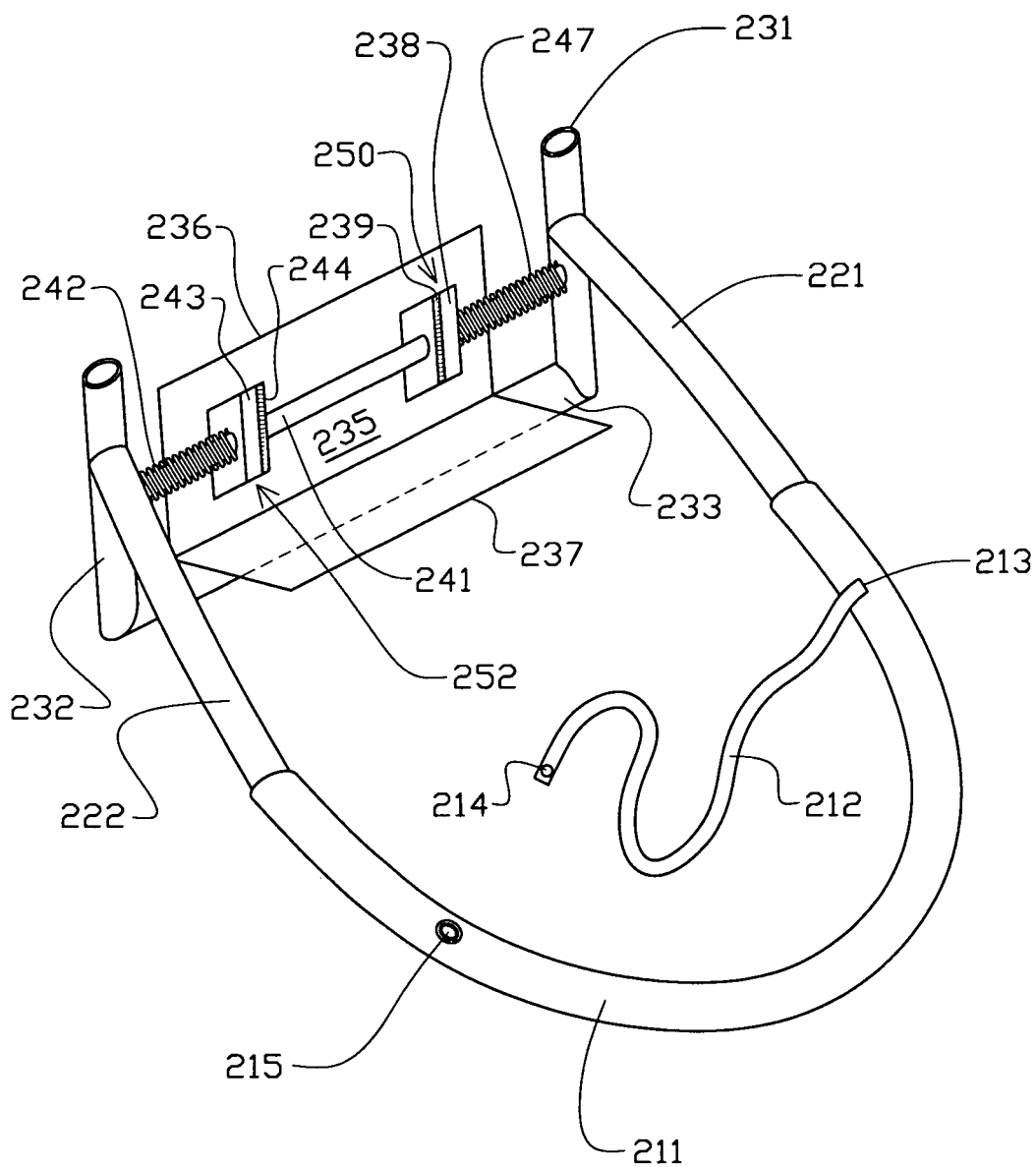

HANDS-FREE VIDEO TELEPHONY

FIELD OF INVENTION

The invention relates generally to mobile device cameras, and more particularly to videotelephony.

PROBLEM STATEMENT

Interpretation Considerations

This section describes the technical field in more detail, and discusses problems encountered in the technical field. This section does not describe prior art as defined for purposes of anticipation or obviousness under 35 U.S.C. section 102 or 35 U.S.C. section 103. Thus, nothing stated in the Problem Statement is to be construed as prior art.

Discussion

Recently, the popularity of video streaming telephone and/or cell-phone calls (sometimes called "videotelephony") has dramatically increased. Users of services such as Apple® computer's service called FaceTime®, for example, enjoy seeing the facial expressions and environment of those that they are conversing with, and want others to share their environment. However, when using videotelephony, typically one must either hold a camera on the device being used in a steady position by hand, or statically mount the device, and both "solutions" have their drawbacks. Holding a camera by hand results in a "bouncy" picture for the person viewing the user, while users of a static camera constantly fall out of the field of view. Accordingly, there is a need to provide a stable and consistent platform for videotelephony. The present invention provides these advantages.

BRIEF DESCRIPTION OF THE DRAWINGS AND TABLES

Various aspects of the invention, as well as an embodiment, are better understood by reference to the following detailed description. To better understand the invention, the detailed description should be read in conjunction with the drawings and tables, in which:

FIG. 1 illustrates an inventive videotelephony mount system.

FIG. 2 shows an inventive embodiment of a videotelephony system.

EXEMPLARY EMBODIMENT OF A BEST MODE

Interpretation Considerations

When reading this section (An Exemplary Embodiment of a Best Mode, which describes an exemplary embodiment of the best mode of the invention, hereinafter "exemplary embodiment"), one should keep in mind several points. First, the following exemplary embodiment is what the inventor believes to be the best mode for practicing the invention at the time this patent was filed. Thus, since one of ordinary skill in the art may recognize from the following exemplary embodiment that substantially equivalent structures or substantially equivalent acts may be used to achieve the same results in exactly the same way, or to achieve the same results in a not dissimilar way, the following exemplary embodiment should not be interpreted as limiting the invention to one embodiment.

Likewise, individual aspects (sometimes called species) of the invention are provided as examples, and, accordingly, one of ordinary skill in the art may recognize from a following exemplary structure (or a following exemplary act) that a substantially equivalent structure or substantially equivalent act may be used to either achieve the same results in substantially the same way, or to achieve the same results in a not dissimilar way.

Accordingly, the discussion of a species (or a specific item) invokes the genus (the class of items) to which that species belongs as well as related species in that genus. Likewise, the recitation of a genus invokes the species known in the art. Furthermore, it is recognized that as technology develops, a number of additional alternatives to achieve an aspect of the invention may arise. Such advances are hereby incorporated within their respective genus, and should be recognized as being functionally equivalent or structurally equivalent to the aspect shown or described.

Second, the only essential aspects of the invention are identified by the claims. Thus, aspects of the invention, including elements, acts, functions, and relationships (shown or described) should not be interpreted as being essential unless they are explicitly described and identified as being essential. Third, a function or an act should be interpreted as incorporating all modes of doing that function or act, unless otherwise explicitly stated (for example, one recognizes that "tacking" may be done by nailing, stapling, gluing, hot gunning, riveting, etc., and so a use of the word tacking invokes stapling, gluing, etc., and all other modes of that word and similar words, such as "attaching").

Fourth, unless explicitly stated otherwise, conjunctive words (such as "or", "and", "including", or "comprising" for example) should be interpreted in the inclusive, not the exclusive, sense. Fifth, the words "means" and "step" are provided to facilitate the reader's understanding of the invention and do not mean "means" or "step" as defined in §112, paragraph 6 of 35 U.S.C., unless used as "means for—functioning—" or "step for—functioning—" in the Claims section. Sixth, the invention is also described in view of the Festo decisions, and, in that regard, the claims and the invention incorporate equivalents known, unknown, foreseeable, and unforeseeable. Seventh, the language and each word used in the invention should be given the ordinary interpretation of the language and the word, unless indicated otherwise.

As will be understood by those of ordinary skill in the art, various structures and devices are depicted in block diagram form in order to avoid unnecessarily obscuring the invention. It should be noted in the following discussion that acts with like names are performed in like manners, unless otherwise stated.

Of course, the foregoing discussions and definitions are provided for clarification purposes and are not limiting. Words and phrases are to be given their ordinary plain meaning unless indicated otherwise.

DESCRIPTION OF THE DRAWINGS

In the Description of the Drawings, simultaneous reference is made to the figures, in which FIG. 1 illustrates an inventive videotelephony mount system 100 that enables a user to have a video-enabled conversation using a mobile device while keeping their hands-free for other activities, such as typing on a computer, while FIG. 2 shows an inventive apparatus embodiment 200 of the videotelephony system 100. The videotelephony system 100 generally comprises a neck-mount system 110, a focus arm system 120 coupled to the neck-mount system 110, and a camera-mount system 130 coupled to the focus-arm system 120.

Figure 1:
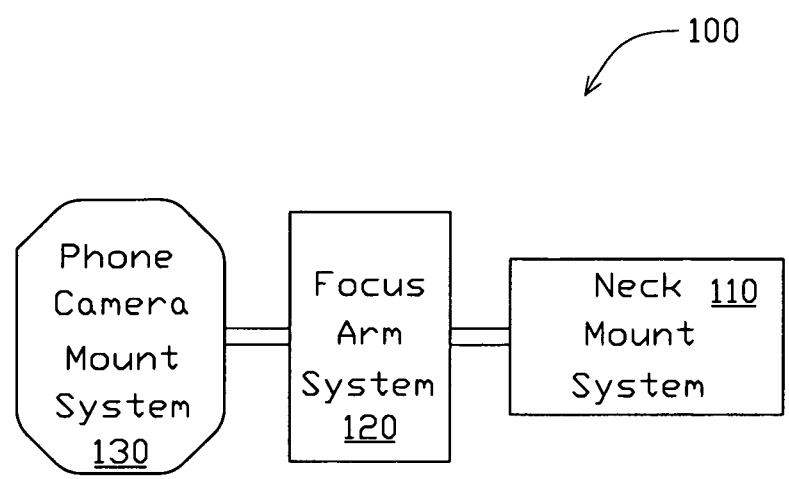

The neck-mount system 110 preferably comprises a neck brace 211 coupled to a strap 212 at a connection point 213, the strap 212 having an attachment portion 214 at an end opposite of the connection point 213. The neck brace 211 further comprises a coupling 215 that is attachable to the attachment portion 214, the coupling located opposite of the connection point 213 on the neck brace 211. In the embodiment shown, the neck brace 211 is a generally hoop-tube structure sized to fit about a back portion of a human neck. However, the neck brace 211 of the neck mount system 110 could also be a generally hoop-tube structure sized to fit about a front portion of a human neck. In the present embodiment, the attachment portion 214 and coupling 215 are snaps. However, the attachment portion 214 and coupling 215 could be straps, or strong Velcro, for example, or any other couplings known to those of ordinary skill in the art. Additionally, the strap 212 could be an elastic material, in which case the attachment portion 214 and coupling 215 could be embodied as a second point.

The focus-arm system 120 comprises at least a first focus arm 221. The focus arm 221 enables a mobile device to be placed at a distance far enough away for the mobile device's camera to properly focus on the user. In one embodiment the first focus arm 221 and second focus arm 222 are telescoping. In an alternative embodiment, the focus arms 221, 222 can be recessed into the neck brace 211. When telescoping or adjustable, the focus-arms 221, 222 comprise a first focus-arm lock and second focus-arm lock.

The camera-mount system 130 comprises a frame having a first holding arm 231 coupled to the first focus arm 221 of the focus-arm system 120, and preferably also having a second holding arm 232 coupled to the second focus arm 222. A base arm 233 is coupled to at least the first holding arm 231 and preferably to the second holding arm 232 as well. The camera-mount system 130 further comprises a stand 235 coupled to the frame 231, 233, 232, and may in one embodiment function to replace the base arm 233. The stand 235 preferably comprises a back 236 and a lip 237 for holding the weight of a mobile device. In one alternative embodiment the stand is pre-sized sized for receiving and holding at least a specific mobile device, and effectively functions as a sleeve.

The camera mount system 130 also comprises a bracing bar 241, which traverses the length of the frame. In a preferred embodiment, a first adjustable holder 250 and a second adjustable holder 252 are coupled about the bracing bar 241. The first adjustable holder 250 comprises a first sliding-portion 238 and a rubber washer 239, and is articulatable via a first spring 247 that is coiled about the bracing bar 241 between the first holding arm 231 and the first sliding portion 238. Likewise the second adjustable holder 252 comprises a second sliding-portion 243 and a second rubber washer 244 coupled about the bracing bar 241 (the rubber washers are adapted to grip a mobile device having a camera thereon). A second spring 242 is coupled between the second sliding-portion 243 and the second holding arm 232.

Various modifications and alterations are apparent to those of ordinary skill in the art upon reading the invention. For example, the articulation illustrated in FIG. 1 and FIG. 2 occurs horizontally relative to the user. However, the articulation could be arranged to be vertical without departing from the scope of the invention. Also, other articulation systems can be used to replace the shown springs. For example, one, two or more worm-screws could be articulated to hold a mobile device, or alternatively spring-loaded or manually expandable lattice, braces, or hinges, for example. Furthermore, the mobile device could be held to the frame via a strap, fabric or plastic or elastic pocket, or equivalent system. Similarly, alternatives to the disclosed neck mount system 110 include systems that are supported by one or both shoulders, or alternatively a neck-brace, for example.

Thus, though the invention has been described with respect to a specific preferred embodiment, many advantages, variations and modifications will become apparent to those skilled in the art upon reading the present application. It is therefore the intention that the appended claims and their functional equivalents be interpreted as broadly as possible in view of the prior art to include all such variations and modifications.

What is claimed is:

1. A hands-free videotelephony system, comprising:
a neck-mount system;
a focus arm system coupled to the neck-mount system;
a camera-mount system coupled to the focus-arm system, wherein the camera-mount system comprises a frame having at least a first holding arm coupled to the focus-arm system, wherein the camera-mount system frame further comprises a base arm coupled to the holding arm; wherein the camera-mount system further comprises a stand coupled to the first holding arm; wherein the frame further comprises a second holding arm coupled to the base arm;
a bracing bar and at least a first adjustable holder coupled to the bracing bar, wherein the first adjustable holder comprises a first sliding-portion coupled about the bracing bar; and
a first spring coiled about the bracing bar, and coupled between the first holding arm and the first sliding portion.

2. The system of claim 1 wherein the neck-mount system comprises a strap.

3. The system of claim 1 wherein the neck-mount system comprises a neck brace.

4. The system of claim 3 wherein the neck brace is a generally hoop-tube structure sized to fit about a back portion of a human neck.

5. The system of claim 3 wherein the neck brace is a generally hoop-tube structure sized to fit about a front portion of a human neck.

6. The system of claim 3 wherein the neck brace is coupled to a strap at a connection point, the strap having an attachment portion at an end opposite of the connection point and the neck brace further comprising a coupling that is attachable to the attachment portion, the coupling located opposite of the connection point on the neck brace.

7. The system of claim 1 wherein the focus-arm system comprises at least one focus arm.

8. The system of claim 7 wherein the focus-arm is telescoping in length.

9. The system of claim 7 wherein the focus-arm comprises a focus-arm lock.

10. The system of claim 1 wherein the stand is pre-sized sized for receiving and holding at least a specific mobile device.

11. The system of claim 1 wherein the second holding arm is coupled to the focus-arm system.

12. The system of claim 1 wherein the stand comprises a back and a lip.

13. The system of claim 1 wherein the camera-mount system further comprises
a second adjustable holder comprising a second sliding-portion coupled about the bracing bar,
a second spring coupled between the second sliding-portion and the second holding arm,
the first adjustable holder having a first rubber washer adapted to couple to a mobile device, and the second adjustable holder a second rubber washer adapted to couple to the mobile device.

* * * * *